United States Patent [19]

Salonimer

[11] 3,743,216
[45] July 3, 1973

[54] HOMING MISSILE SYSTEM USING LASER ILLUMINATOR

[75] Inventor: David J. Salonimer, Huntsville, Ala.

[73] Assignee: The United States of America as represented by the Secretary of the Army, Washington, D.C.

[22] Filed: Jan. 9, 1969

[21] Appl. No.: 790,516

[52] U.S. Cl.............................. 244/3.16, 102/70.2
[51] Int. Cl........ F41g 7/18, F42b 15/02, F41g 9/00
[58] Field of Search................................... 244/3.16

[56] References Cited
OTHER PUBLICATIONS

"The Incredible Laser" pages 29 to 35 inclusive Army, April, 1968

"Varied Tactical Uses Developing for Laser" pages 39, 43, 47, 49, 50, 55 Avionics May 31, 1965 issue of Aviation Week & Space Technology.

Pulsed Optical Laser Radar Sperry Engineering Review pgs. 44–53 inclusive.

Primary Examiner—Benjamin A. Borchelt
Assistant Examiner—Thomas H. Webb
Attorney—Harry M. Saragovitz, Edward J. Kelly, Herbert Berl and Aubrey J. Dunn

[57] ABSTRACT

A missile homes on reflected illumination of targets illuminated by a laser. The missile includes means energizible to detect the reflected illumination, with the means periodically energized by a synchronizing signal from the illuminator.

2 Claims, 2 Drawing Figures

Patented July 3, 1973 3,743,216

David J. Salonimer,
INVENTOR

Harry M. Saragovitz
Edward J. Kelly
Herbert Berl
Aubrey J. Dunn

BY

HOMING MISSILE SYSTEM USING LASER ILLUMINATOR

BACKGROUND OF THE INVENTION

The use of laser illumination for target engagement by a homing missile has been suggested, but the schemes suggested to date have various drawbacks. The use of a continuous wave laser has the disadvantage that the high output powers necessary to overcome background and other noises are difficult or impractical to maintain. A pulsed laser can provide high power levels during the pulses, but a detector responding to reflected illumination from such pulses would be exposed to background noise between pulses. The natures of these two laser illumination schemes are such that countermeasures could readily be used against them. Pyrotechnic flares or decoys having the correct wavelengths could cause homing missiles to be decoyed from true targets. Even if a pulsed laser illuminator were used, a decoy could still be effective, and as a matter of fact, a homing missile might well home on a continuous wave decoy more readily than on pulsed reflected laser illumination.

SUMMARY OF THE INVENTION

The invention overcomes the above deficiencies of laser illuminators by employing a detector on the homing missile, which detector is synchronized with the pulses of illumination from the laser. That is, the detector on the missile is only effective some time after a pulse of illumination, when a reflected pulse could be expected from a target. The provision of countermeasures against such a system as the invention is much more difficult than a system not employing a synchronized detector on the missile. The synchronizing signals from the laser illuminator to the missile could be provided by a radio link.

DESCRIPTION OF THE PREFERRED EMBODIMENT

Figure 1:
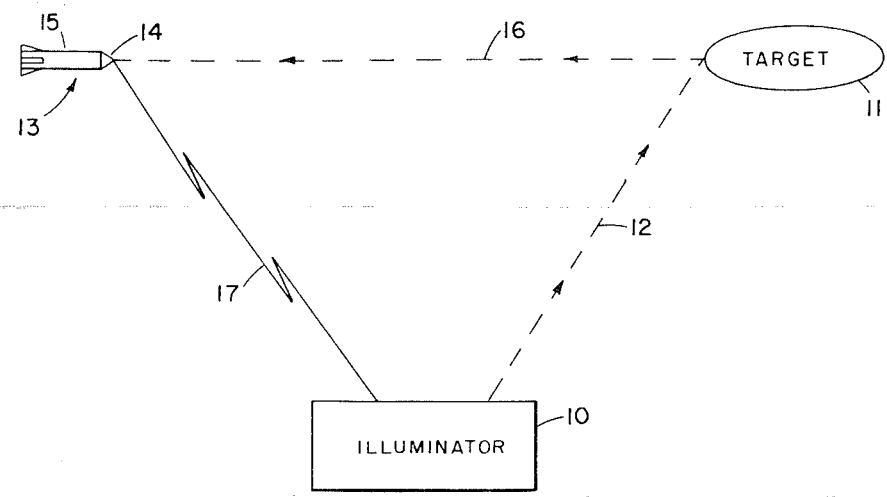
FIG. 1 is a schematic showing of the system of the invention.

Referring to FIG. 1, numeral 10 designates a laser illuminator providing pulses for illuminating a target 11 with a laser beam 12. Illuminator 10 may be manportable or vehicle mounted, as desired, and is manually aimed at the target. Numeral 13 designates a homing missile including a nosecone portion 14 and a body portion 15. Nosecone 14 includes a warhead and means for detecting reflected illumination 16 from said target, and means for detecting command or synchronizing signals 17 from illuminator 10, and means for guiding said missile toward said target. Missile 13 may be launched from a launcher remote from illuminator 10 and given an initial heading to bring it into position to detect reflected illumination from the target, or it may be launched from a launcher adjacent illuminator 10, as desired.

Figure 2:
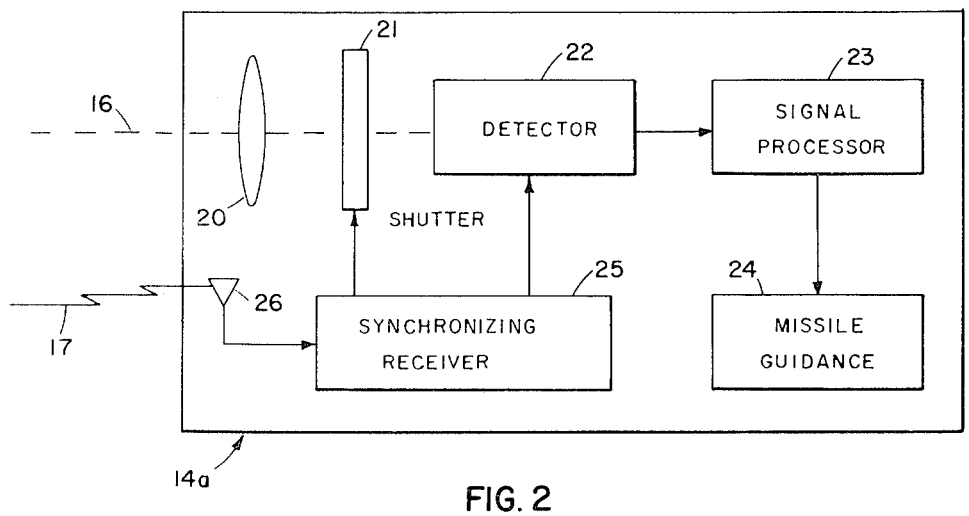
FIG. 2 is a schematic showing of the synchronizing and control circuits of the missile of the invention.

Referring now to FIG. 2, part of the contents of nosecone 14 are shown and designated 14a. The warhead portion of the nosecone is not included in 14a. Numeral 20 designates an optical system for collecting reflected illumination 16 from the target. The illumination gathered by the optical system passes through shutter 21 to an imaging detector 22. The output of 22 goes through signal processor 23 to provide an input to the missile guidance system (24). Detector 22 may take any one of several forms, such as a vidicon. In the event that a vidicon imaging detector is used, elements 21 (shutter) and 22 (detector) can readily be combined. The vidicon can be controlled in sweep and "on" time by a synchronizing circuit 25. Receiver 25 receives synchronizing signals 17 by way of antenna 26. The synchronizing receiver may employ a circuit similar to those circuits used in a television camera or receiver. The position of the target image on detector 22 determines the output of signal processing block 23, which block controls the guidance system 24. The signal processing may be accomplished by various known circuits, such as those shown in U. S. Pat. Nos. 2,970,187 and 3,257,505, respectively issued Jan. 31, 1961 and June 21, 1966.

While the optics of FIG. 2 have been shown as refracting type, it is obvious that reflecting optics could be used, if desired.

The laser illumination could be either of visible, infrared, or ultraviolet wavelength, as desired.

The targets upon which the invention would be practical are those which are reflectors for the particular wavelength of laser illumination being used. Such targets could include vehicles, personnel, watercraft, aircraft, or emplacements.

While a specific embodiment of the invention has been disclosed, other embodiments of the invention may be obvious to one skilled in the art, in view of the instant disclosure.

Obviously, the invention could be used with a missile which closes a target at either a constant intercept angle or a varying intercept angle.

I claim:

1. A missile system for intercepting a target including a pulsed laser for periodically illuminating said target with electromagnetic radiation, radio transmitting means operating in synchronism with said laser, means periodically energizible in said missile for detecting reflected illumination from said target, means including radio receiving means for energizing said means for detecting, and means for steering said missile toward said target in response to the reflected illumination detected by said means for detecting wherein said means for detecting is energized in a synchronous relation to the operation of said laser.

2. The missile system as defined in claim 1 wherein said electromagnetic radiation is of a light wavelength.

* * * * *